(12) United States Patent
Huang et al.

(10) Patent No.: US 12,244,225 B2
(45) Date of Patent: Mar. 4, 2025

(54) SYSTEMS AND METHODS FOR REDUCING EFFECTS OF LEAKAGE INDUCTANCE IN FLYBACK DC-DC CONVERTERS

(71) Applicant: Navitas Semiconductor Limited, Dublin (IE)

(72) Inventors: Xiucheng Huang, Torrance, CA (US); Bin Li, Pleasanton, CA (US); Weijing Du, Torrance, CA (US); Yun Zhou, Shenzhen (CN)

(73) Assignee: Navitas Semiconductor Limited, Dublin (IE)

( * ) Notice: Subject to any disclaimer, the term of this patent is extended or adjusted under 35 U.S.C. 154(b) by 285 days.

(21) Appl. No.: 17/933,803

(22) Filed: Sep. 20, 2022

(65) Prior Publication Data

US 2023/0090234 A1 Mar. 23, 2023

Related U.S. Application Data

(60) Provisional application No. 63/264,143, filed on Nov. 16, 2021.

(30) Foreign Application Priority Data

Sep. 23, 2021 (CN) .......................... 202111116824.1

(51) Int. Cl.
| | | |
|---|---|---|
| *H02M 1/34* | (2007.01) | |
| *H02M 1/44* | (2007.01) | |
| *H02M 3/335* | (2006.01) | |
| *H02M 1/00* | (2006.01) | |
| *H02M 1/32* | (2007.01) | |

(52) U.S. Cl.
CPC ............. *H02M 1/44* (2013.01); *H02M 1/344* (2021.05); *H02M 3/3353* (2013.01); *H02M 3/33569* (2013.01); *H02M 1/0054* (2021.05); *H02M 1/32* (2013.01); *H02M 3/33507* (2013.01)

(58) Field of Classification Search
CPC .... H02M 1/0048; H02M 1/0054; H02M 1/32; H02M 1/34; H02M 1/342; H02M 1/344; H02M 1/44; H02M 3/335; H02M 3/33507; H02M 3/33515; H02M 3/33523;
(Continued)

(56) References Cited

U.S. PATENT DOCUMENTS

| | | | | |
|---|---|---|---|---|
| 11,342,836 B2 * | 5/2022 | Yang | .................. | H02M 3/33507 |
| 2020/0091826 A1 * | 3/2020 | Yang | .................. | H02M 3/33515 |

(Continued)

*Primary Examiner* — Thienvu V Tran
*Assistant Examiner* — Shahzeb K Ahmad
(74) *Attorney, Agent, or Firm* — Fisher Broyles, LLP

(57) ABSTRACT

A flyback DC-DC converter. The converter having a transformer with a primary and a secondary windings, first and second switches, a capacitor coupled between the second switch and the primary winding, where the second switch is arranged to operate such that a sum of a first and second time periods equals a sum of third and fourth time periods, where the first time period is a delay time period from a time that the first switch is turned off to a time that the second switch is turned on, the second time period is a time period that the second switch is on, the third time period is a resonance time period of a resonator formed by a leakage inductance of the transformer and a capacitance of the capacitor, and the fourth time period is a time period for discharge of the leakage inductance of the transformer into the capacitor.

20 Claims, 8 Drawing Sheets

(58) Field of Classification Search
CPC ........... H02M 3/3353; H02M 3/33571; H02M 3/33569; H02M 3/337; Y02B 70/10
See application file for complete search history.

(56) References Cited

U.S. PATENT DOCUMENTS

| | | | |
|---|---|---|---|
| 2021/0143730 A1* | 5/2021 | Yang | H02M 3/33507 |
| 2021/0167680 A1* | 6/2021 | Odell | H02M 3/33507 |
| 2021/0408929 A1* | 12/2021 | Bianco | H02M 1/34 |
| 2022/0190704 A1* | 6/2022 | Lai | H02M 1/44 |

* cited by examiner

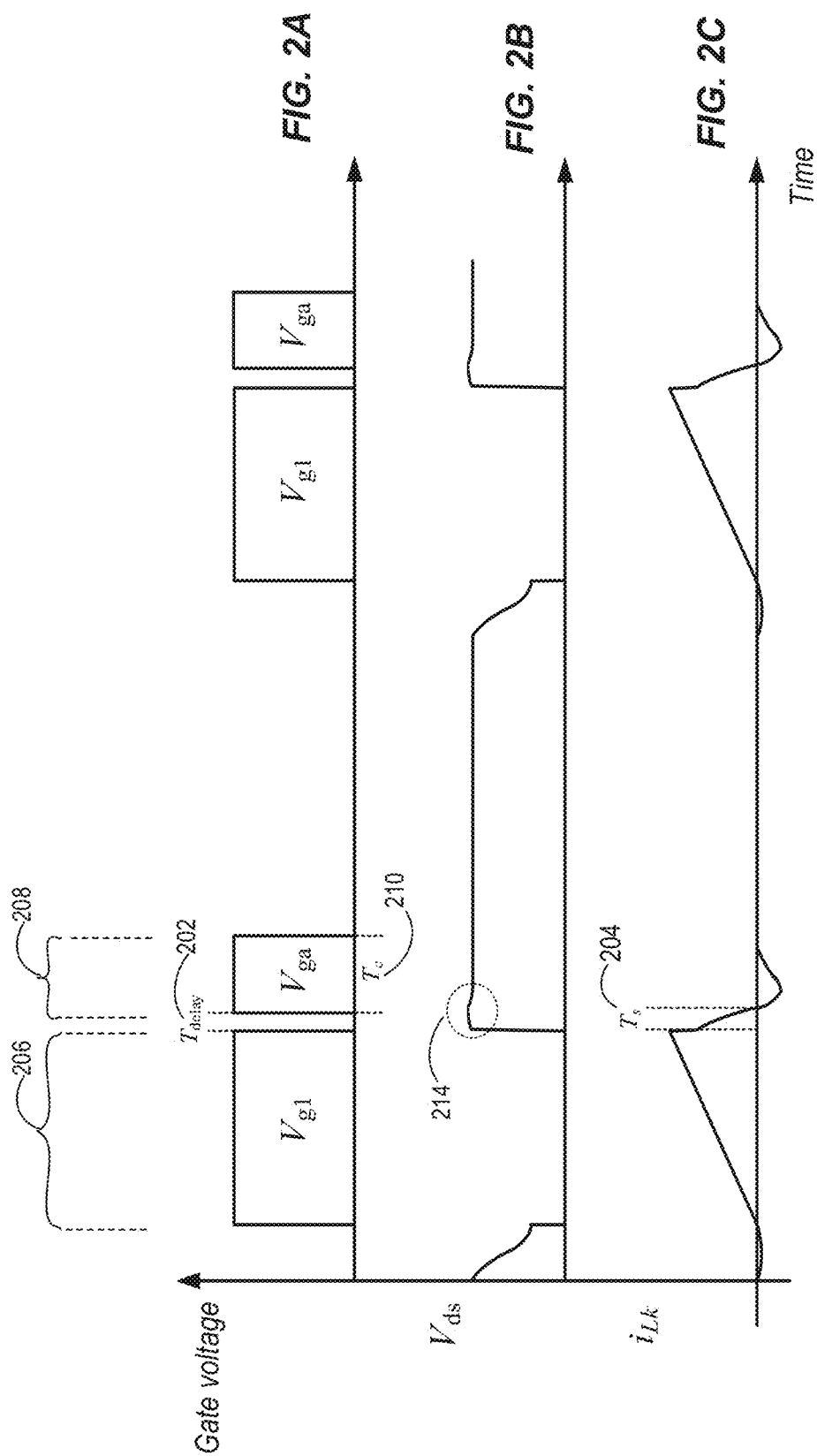

SYSTEMS AND METHODS FOR REDUCING EFFECTS OF LEAKAGE INDUCTANCE IN FLYBACK DC-DC CONVERTERS

CROSS-REFERENCE TO RELATED APPLICATIONS

The present application claims priority to Chinese Patent Application No. 202111116824.1 filed on Sep. 23, 2021, entitled "A METHOD FOR ABSORBING LEAKAGE INDUCTANCE ENERGY OF FLYBACK DC-DC CONVERTERS", and U.S. Provisional Patent Application No. 63/264,143, filed on Nov. 16, 2021, entitled "SYSTEMS AND METHODS FOR REDUCING EFFECTS OF LEAKAGE INDUCTANCE IN FLYBACK DC-DC CONVERTERS", the contents of all of which are incorporated herein by reference in their entirety for all purposes.

FIELD

The described embodiments relate generally to transformers used in converters, and more particularly, the present embodiments relate to systems and methods for reducing effects of leakage inductance in flyback DC-DC converters.

BACKGROUND

Electronic devices such as computers, servers and televisions, among others, employ one or more electrical power conversion circuits to convert one form of electrical energy to another. Some electrical power conversion circuits convert a high DC voltage to a lower DC voltage using a circuit topology called a half bridge converter. As many electronic devices are sensitive to size and efficiency of the power conversion circuit, new power converters can provide relatively higher efficiency and lower size for the new electronic devices.

SUMMARY

In some embodiments, a circuit is disclosed. The circuit includes a flyback DC-DC converter including a transformer having a primary winding and a secondary winding, the primary winding extending from a first terminal to a second terminal, a first switch having a first gate terminal, a first source terminal and a first drain terminal, the first drain terminal coupled to the first terminal of the primary winding, a second switch having a second gate terminal, a second source terminal and a second drain terminal, the second source terminal coupled to the first terminal of the primary winding, and a capacitor coupled between the second drain terminal and the second terminal of the primary winding, where the second switch is arranged to transition between on and off states such that a sum of a first time period and second time period equals a sum of third time period and fourth time period, wherein: the first time period is a delay time period from a time that the first switch is turned off to a time that the second switch is turned on; the second time period is a time period that the second switch is on; the third time period is a resonance time period of a resonator, the resonator formed by a leakage inductance of the transformer and a capacitance of the capacitor; and the fourth time period is a time period to discharge the leakage inductance of the transformer into the capacitor.

In some embodiments, the circuit further includes a resistor coupled between the capacitor and the second drain terminal.

In some embodiments, a resistance of the resistor is equal to or greater than twice a square root of a ratio of the leakage inductance to a capacitance of the capacitor.

In some embodiments, the circuit further includes a diode having an anode and a cathode, the anode coupled to the second source terminal and the cathode coupled to the second drain terminal.

In some embodiments, the first switch is a metal-oxide-semiconductor field effect transistor (MOSFET).

In some embodiments, the first switch is gallium nitride (GaN) based transistor.

In some embodiments, the second switch is a GaN based transistor and wherein the first switch and the second switch are integrated on a single GaN based die.

In some embodiments, a method of controlling a circuit is disclosed. The method includes providing a flyback DC-DC converter having a transformer with a primary winding and a secondary winding, the primary winding extending from a first terminal to a second terminal, a first switch having a first gate terminal, a first source terminal and a first drain terminal, the first drain terminal coupled to the first terminal of the primary winding, a second switch having a second gate terminal, a second source terminal and a second drain terminal, the second source terminal coupled to the first terminal of the primary winding, and a capacitor coupled between the second drain terminal and the second terminal of the primary winding, and controlling an operation of the second switch such that a sum of a first time period and second time period is equal greater than a sum of third time period and fourth time period, where: the first time period is a delay time period from a time that the first switch is turned off to a time that the second switch is turned on; the second time period is a time period that the second switch is on; the third time period is a resonance time period of a resonator, the resonator formed by a leakage inductance of the transformer and a capacitance of the capacitor; and the fourth time period is a time period to discharge the leakage inductance of the transformer into the capacitor.

In some embodiments, the method further includes providing a resistor coupled between the capacitor and the second drain terminal.

In some embodiments, in the method, a resistance of the resistor is equal to or greater than twice a square root of a ratio of the leakage inductance to a capacitance of the capacitor.

In some embodiments, the method further includes providing a diode having an anode and a cathode, the anode coupled to the second source terminal and the cathode coupled to the second drain terminal.

In some embodiments, in the method, the first switch is a metal-oxide-semiconductor field effect transistor (MOSFET).

In some embodiments, in the method, the first switch is gallium nitride (GaN) based transistor.

In some embodiments, in the method, the second switch is a GaN based transistor and wherein the first switch and the second switch are integrated on a single GaN based die.

BRIEF DESCRIPTION OF THE DRAWINGS

FIGS. 2A-2F show various timing diagrams of the operation of the flyback DC-DC converter circuit of FIG. 1;

DETAILED DESCRIPTION

Figure 1:
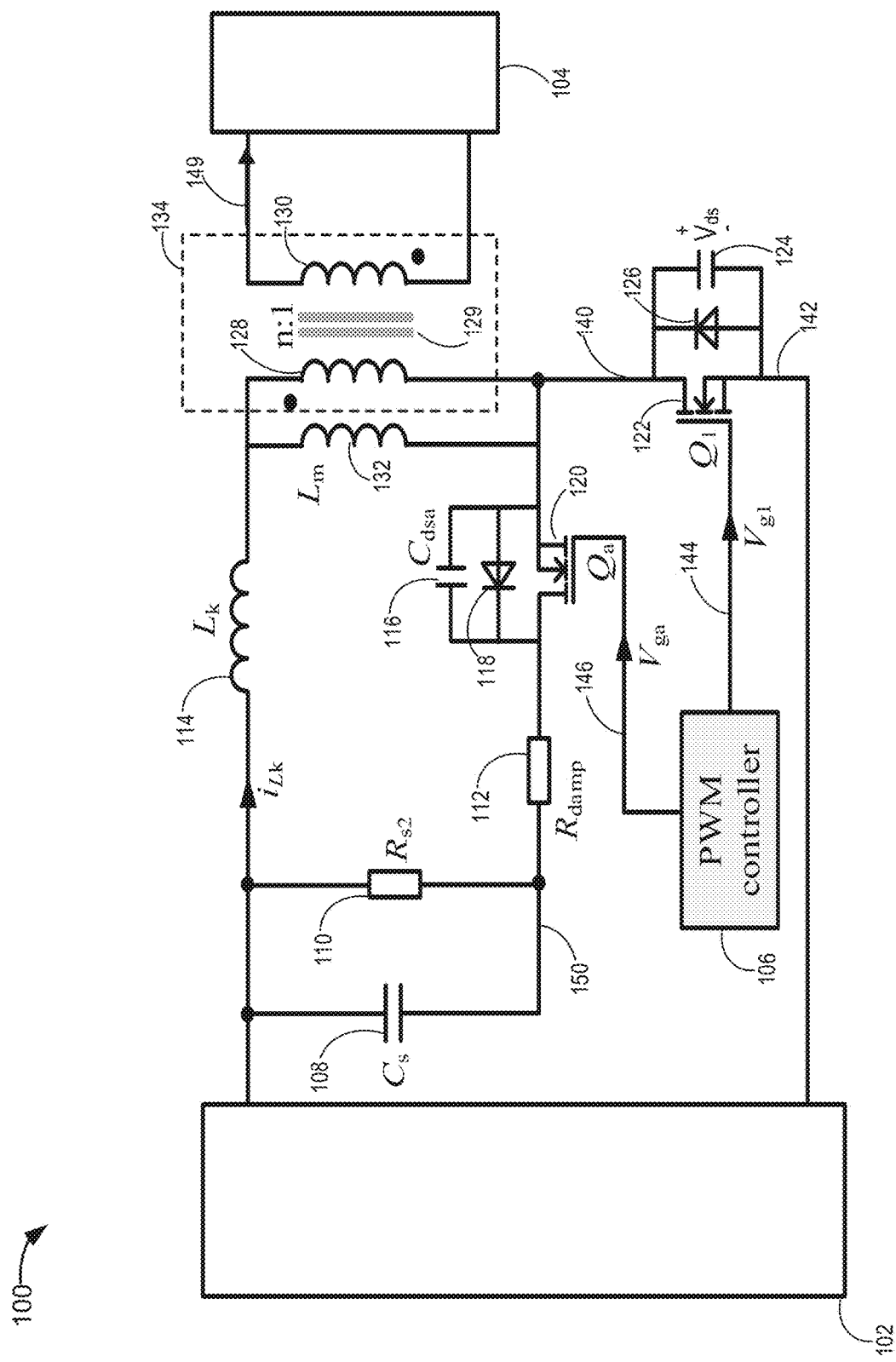
FIG. 1 illustrates a flyback DC-DC converter circuit with a clamping switch and a damping resistor according to an embodiment of the disclosure.

Circuits, devices and related techniques disclosed herein relate generally to converters. More specifically, circuits, devices and related techniques disclosed herein relate to systems and methods for reducing effects of leakage inductance energy in flyback DC-DC converters. In some embodiments, a flyback DC-DC converter can include a clamping switch and a damping resistor that are arranged to reduce the effects of leakage inductance energy. By reducing the effects of leakage inductance energy, power losses in the flyback DC-DC converter can be reduced resulting in an overall improvement in efficiency of the converter. Further, the reduction of the effects of leakage inductance energy in the converter can substantially reduce the amplitude of voltage spikes on internal nodes, and resulting in a reduction in dV/dt on the internal nodes of the converter, therefor reducing voltage stresses on the internal components of the converter. Thus, the maximum voltage rating of the internal components of the converter can be reduced, resulting in savings in system costs. Moreover, a reduction in dV/dt in the converter can result in an improved electromagnetic interference (EMI) performance of the converter.

In various embodiments, an adaptive control technique of an on-time of the clamping switch can be employed to control a starting time and a duration of the turn-on of the clamping switch, thereby reducing oscillations and voltage spikes. In some embodiments, in a flyback DC-DC converter, the clamping switch is arranged to operate such that a sum of a first time period and second time period equals to a sum of third time period and fourth time period, where the first time period is a delay time period from a time that the main switch is turned off to the time that the clamping switch is turned on, the second time period is a time period from when the clamping switch enters its on-state to the time that the clamping switch is turned off, the third time period is a resonance time period of a resonator formed by a leakage inductance of the transformer and a capacitance of the first capacitor, and the fourth time period is a time period for discharging of the leakage inductance of the transformer into the first capacitor. Embodiments of the disclosure further enable improvement of efficiency during light-load operation. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a flyback DC-DC converter circuit 100 with a clamping switch and a damping resistor according to an embodiment of the disclosure. As shown in FIG. 1, the flyback DC-DC converter circuit 100 can include an input circuit 102 and an output circuit 104. The flyback DC-DC converter circuit 100 can include a transformer 134 having a primary side winding 128, a magnetic core 129 and a secondary side winding 130. The transformer 134 can be arranged to provide isolation between the input circuit 102 and the output circuit 104.

The flyback DC-DC converter circuit 100 can include a main switch 122 ($Q_1$) with a drain 140, a source 142 and a gate 144. In some embodiments, the main switch 122 may include a body diode 126 and an output capacitor 124 that can be connected between a source terminal and a drain terminal of the main switch 122. The main switch 122 can be controlled by a pulse width modulated (PWM) controller circuit 106. The PWM controller circuit 106 can cause the main switch 122 to turn on, thereby closing a loop in the primary side. In this way, energy is built up in the primary side winding 128. When the main switch 122 is turned off, the energy built up in the primary side winding 128 can be transferred to the secondary side, resulting in the output circuit 104 supplying energy to an output load.

A non-ideality of a flyback transformer can be its leakage inductance. An ideal transformer may have perfect coupling between the primary and secondary windings with no losses. However, in practice, the coupling can be less than 100 percent leaving what is in effect an inductance in series with the primary coil. The leakage inductance of the transformer can be represented by an inductor 114 having a leakage inductance $L_k$. Therefore, when the main switch 122 is turned off, there can be a relatively high voltage spike generated across the inductor 114. A combination of the inductor 114 and any capacitances in the circuit can cause ringing to appear at the drain 140. The ringing frequency created may also degrade the EMI spectrum of the flyback DC-DC converter. Embodiments of the present disclosure can reduce the effects of the leakage inductance, thereby reducing EMI radiation.

In the flyback DC-DC converter circuit 100, inductor 114 represents a leakage inductance ($L_k$) of the flyback DC-DC converter and inductor 132 represents a magnetizing inductance ($L_m$) of the flyback DC-DC converter. The flyback DC-DC converter circuit 100 can include a clamping switch 120 and a damping resistor 112. In some embodiments, switch 120 may include a body diode 118 that is connected between a source terminal and a drain terminal of the switch 120. Output capacitor 116 is an output capacitance of the switch 120 and may be connected between the source terminal and the drain terminal of the switch 120. A resistor 110 and a storage capacitor 108 having a capacitance of $C_s$ can be coupled to the damping resistor 112 at node 150. In some embodiments, storage capacitor 108 can include a plurality of capacitors connected in parallel, while in alternate or additional embodiments, the storage capacitor 108 can include a plurality of capacitors connected in series. The PWM controller circuit 106 can be coupled to the gate 146 of the clamping switch 120. A current $i_{Lk}$ of the leakage inductance $L_k$ can flow through the clamping switch 120 and/or the body diode 118. In various embodiments, the clamping switch 120 can be, for example, a silicon MOSFET or a compound semiconductor switch, such as a GaN based HEMT.

When the main switch 122 is turned off, the leakage inductance energy of $L_k$ can be stored in the storage capacitor 108 through the switch 120 and/or diode 118. During the time period for charging of the storage capacitor 108, the leakage inductance current $i_{Lk\_can}$ may flow clock-wise through the body diode 118 and the damping resistor 112 to the storage capacitor 108. Resistor 110 can provide damping of some of the stored energy in the storage capacitor 108. The charging of the storage capacitor 108 allows for the absorption of the leakage inductance energy into the storage capacitor 108. The remainder of energy stored in the storage capacitor 108 can subsequently be released by a counter-clock-wise flow of the current $i_{Lk}$ through the damping resistor 112 and the clamping switch 120 to the primary side winding 128. The released energy into the primary side winding 128 can then be transmitted to the secondary side winding 130 through resonance of the storage capacitor 108 and the leakage inductance $L_k$. This can cause oscillations and voltage spikes at various nodes of the circuit 100. Embodiments of the present disclosure can reduce these effects by precisely controlling a turn-on time of the clamping switch 120. The clamping switch 120 can be turned on after a delay time $T_{delay}$ following the turn-off of the main switch 122. The delay time $T_{delay}$ can be controlled by the PWM controller circuit 106.

This is illustrated in FIGS. 2A, 2B and 2C timing diagrams. As shown in FIG. 2A, during a first time period 206 the gate 144 is in a high state and the main switch 122 is on. At the end of the first time period 206 the main switch 122 is turned off where a voltage at the gate 144 ($V_{g1}$) goes to a low state, the PWM controller circuit 106 may provide a delay time $T_{delay}$ 202. A gate voltage ($V_{ga}$) at the gate 146 can go high thereby turning on the clamping switch 120. The delay time $T_{delay}$ can be controlled so as not to exceed a time period $T_S$ 204, where $T_S$ is the time that it takes for the current $i_{Lk}$ to charge the storage capacitor 108. The relationship between $T_{delay}$ and $T_S$ can be expressed as $T_{delay} \le T_s$. FIG. 2B shows drain to source voltage ($V_{ds}$) of the main switch 122. As can be seen, during time period 214, embodiments of the present disclosure can eliminate voltage spikes on $V_{ds}$ and eliminate ringing and/or oscillations of $V_{ds}$. FIG. 2C shows the leakage inductance current $i_{Lk}$ as a function of time. As can be seen, the leakage inductance current $i_{Lk}$ rises during a first time period 206 (clock-wise flow) and reverses direction (counter-clock-wise flow) during a second time period 208.

After the main switch 122 is turned off, the clamping switch 120 may not be turned on immediately, but it can be turned on after a delay $T_{delay}$. The on-time of the clamping switch 120 is denoted by time duration ($T_c$) 210. In order to reduce oscillations due to release of leakage inductance current, the delay $T_{delay}$ may be set to be less than or equal to the time period $T_s$ (the time that it takes for the current $i_{Lk}$ to charge the storage capacitor 108), i.e., $T_{delay} \le T_s$. During the second time period 208, the clamping switch 120 may be on and the stored energy in the storage capacitor 108 may be transmitted to the secondary side winding 130 through the resonance formed by the capacitance of storage capacitor 108 and the leakage inductance of the transformer $L_k$.

Figure 2D:
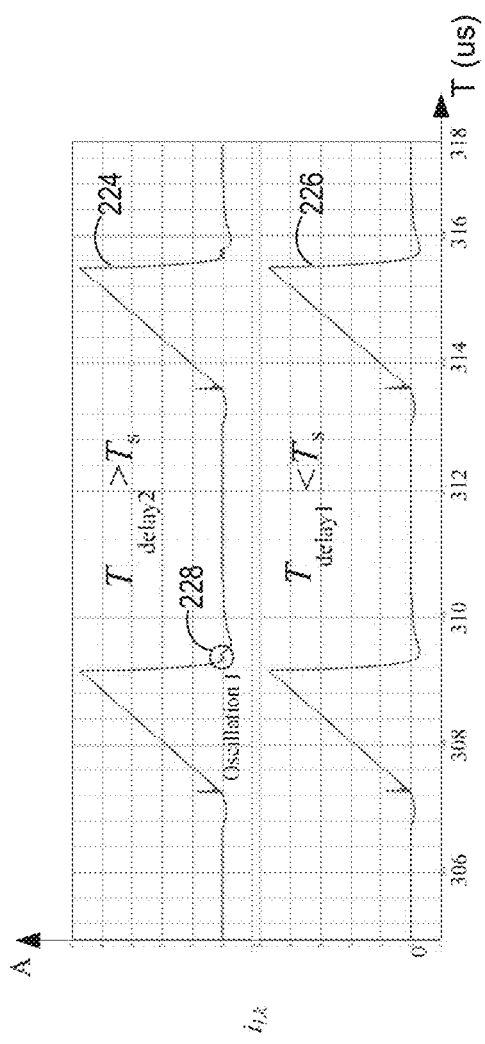

FIG. 2D shows leakage inductance current $i_{Lk}$ as a function of time for various turn-on delay times of the clamping switch 120. Waveform 224 shows $i_{Lk}$ where Tdelay>$T_s$, as compared to waveform 226 where $T_{delay} \le T_s$. As can be seen, by setting $T_{delay} \le T_s$, embodiments of the disclosure can eliminate high frequency oscillations, such as the oscillation shown at 228. By turning on the clamping switch 120 during charging of the storage capacitor 108, i.e., $T_{delay} \le T_s$, high frequency oscillations can be eliminated, thereby improving the electro-magnetic compatibility (EMC) performance of the converter. The high frequency oscillation at 228 may be caused by the resonance formed by the output capacitor 116 of the clamping switch 120 and the leakage inductance $L_k$. This resonance can be eliminated by timely turning-off the clamping switch 120.

In some embodiments, in order to reduce ringing and/or oscillations in the currents during the absorption of the leakage inductance energy into storage capacitor 108, and during the release of the energy stored in the storage capacitor 108, the sum of the delay $T_{delay}$ and the on-time duration $T_c$ 210 can be set to be equal or slightly greater than the sum of the time $T_s$ for absorbing the leakage inductance energy and the resonance period $T_R$, where the resonance period $T_R$ is the period of resonance between the leakage inductance $L_k$ and the capacitance $C_s$. Thus, $$T_{delay}+T_c \ge 2\pi\sqrt{L_k C_s}+T_s \qquad \text{Equation (1)}$$

where $L_k$ is the leakage inductance of the transformer 134, $C_s$ is a value of the capacitance of the storage capacitor 108, and $T_s$ is the time for absorbing the leakage inductance energy into the storage capacitor 108. In some embodiments, a size of the clamping switch 120 can be smaller than the size of main switch 122, i.e. the on-resistance (Rdson) of the clamping switch 120 can be higher than the Rdson of the main switch 122. For example, the Rdson of the clamping switch can be 3 to 5 ohm for a 650 V rated device, while the Rdson of the main switch can 0.150 ohm for a 650 V rated device. However, other suitable values for on-resistance and voltage ratings can be used. In various embodiments, the clamping switch may be a silicon MOSFET or a gallium nitride (GaN) based switch. In some embodiments, the GaN based clamping switch can be integrated into the same die as the main switch. In various embodiments, the GaN based clamping switch can allow for improved reverse recovery characteristics compared to those of silicon MOSFETs.

Figure 2E:
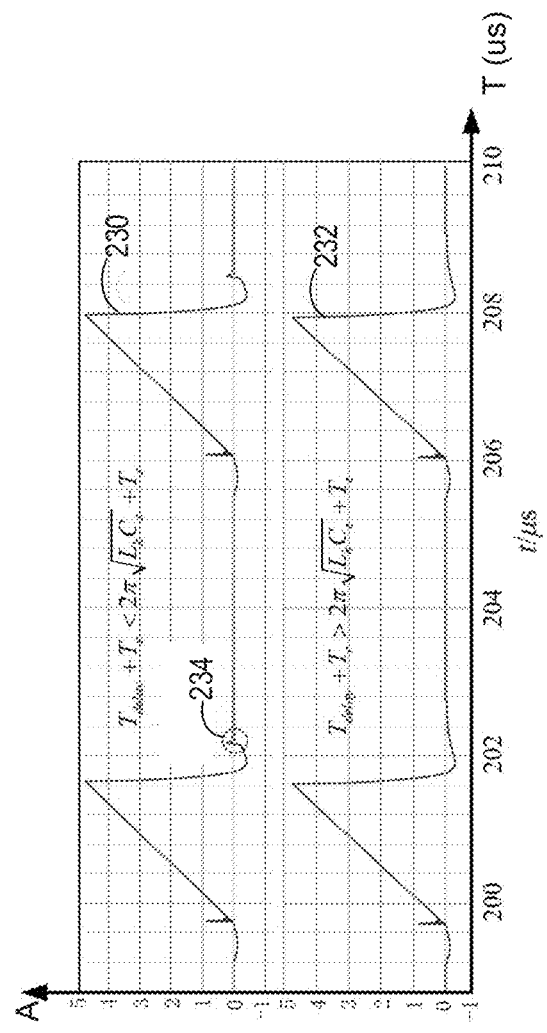

FIG. 2E shows leakage inductance current $i_{Lk}$ as a function of time for various turn-on delay times of the clamping switch 120. Waveform 230 shows $i_{Lk}$ where the clamping switch 120 is turned off ahead of time. It can be seen from that the leakage inductance current can have a high frequency oscillation at 234, which can be caused by the resonance between the output capacitor 116 of the clamping switch 120 and the leakage inductance $L_k$. Waveform 232 shows $i_{Lk}$ where the on time $T_c$ satisfies equation (1) according to embodiments of the disclosure, thereby high frequency oscillations can be eliminated and the EMC performance of the converter can be improved.

As shown in FIG. 1, a damping resistor 112 can be employed in the path of the leakage inductance current $i_{Lk}$ in order to reduce oscillation peaks during the charging and discharging of the storage capacitor 108. By reducing current oscillation peaks in the primary side, a current stress in the output rectifier diode on the secondary side can also be reduced. In order to determine a value of a resistance $R_{damp}$ of the damping resistor 112, the currents produced during the absorption and release of leakage inductance energy may be critically damped or overdamped. The critically damped or overdamped condition can suppress oscillation peaks and can set a boundary value for the value of the damping resistor. The value of the resistance of the damping resistor $R_{damp}$ may be expressed as:

$$R_{damp} \geq 2\sqrt{\frac{L_k}{C_s}}$$

where $L_k$ is the leakage inductance, and $C_s$ is the capacitance of the storage capacitor 108.

Figure 2F:
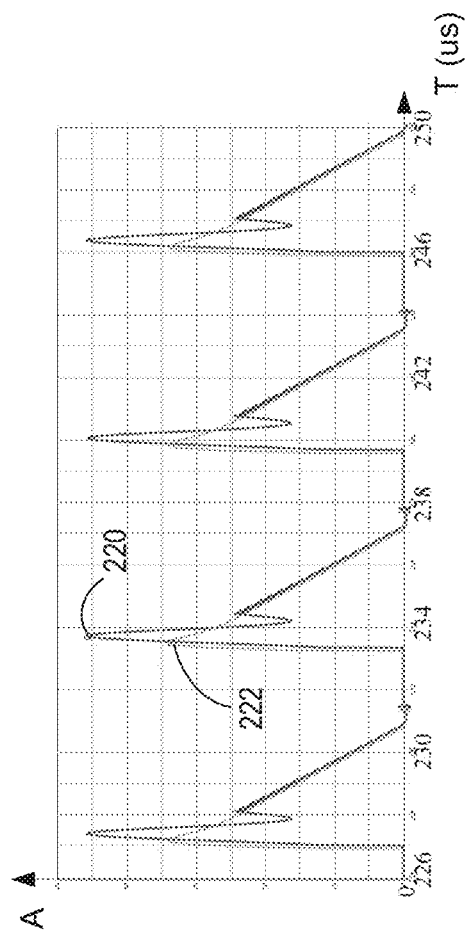

FIG. 2F shows a comparison of an addition of the damping resistor 112 $R_{damp}$ on a secondary side output current 149. Waveform 222 shows that the output current 149 may peak at a relatively lower value with the implementation of the damping resistor 112 in circuit 100, as compared to waveform 220 where there is no damping resistor 112 included in circuit 100.

Figure 3:
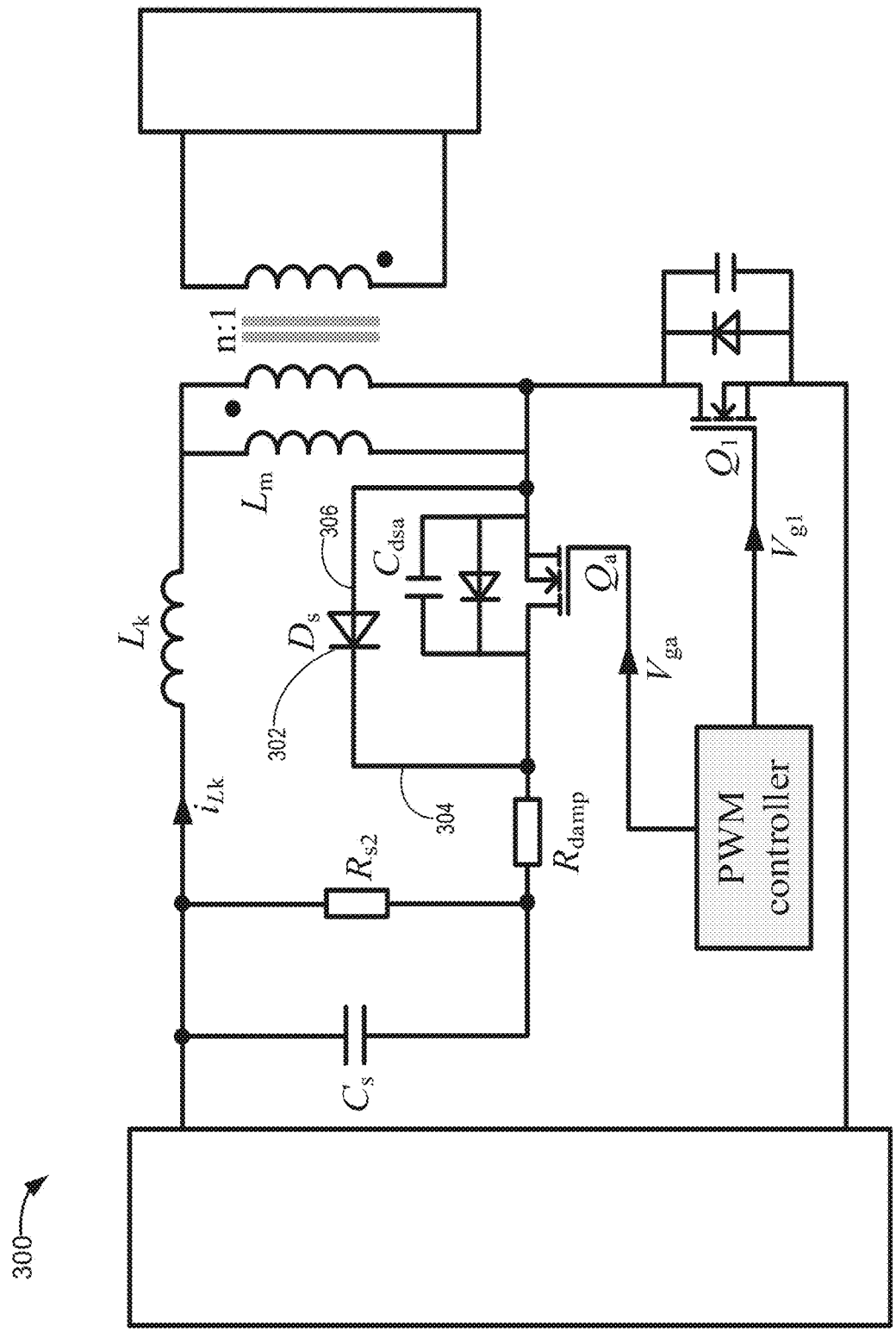
FIG. 3 illustrates a flyback DC-DC converter circuit, which is similar to circuit of FIG. 1 with an addition of a diode according to an embodiment of the disclosure.

FIG. 3 illustrates a flyback DC-DC converter circuit 300, which is similar to circuit 100, with an addition of a diode 302 according to an embodiment of the disclosure. In circuit 300 a diode 302 has been added between nodes 304 and 306, i.e. the diode 302 can be connected in parallel with the clamping switch 120. The body diode 118 of the clamping switch may have a relatively high voltage drop during conduction, thus when the leakage inductance current $i_{Lk}$ is flowing through the body diode 118 to the storage capacitor 108, there can be some power loss present which can reduce the efficiency of the converter. The diode 302 can be connected in parallel with the clamping switch in order to provide a low voltage drop path for the leakage inductance current $i_{Lk}$, thus reducing power losses during the clock-wise conduction of the leakage inductance current $i_{Lk}$.

Figure 4:
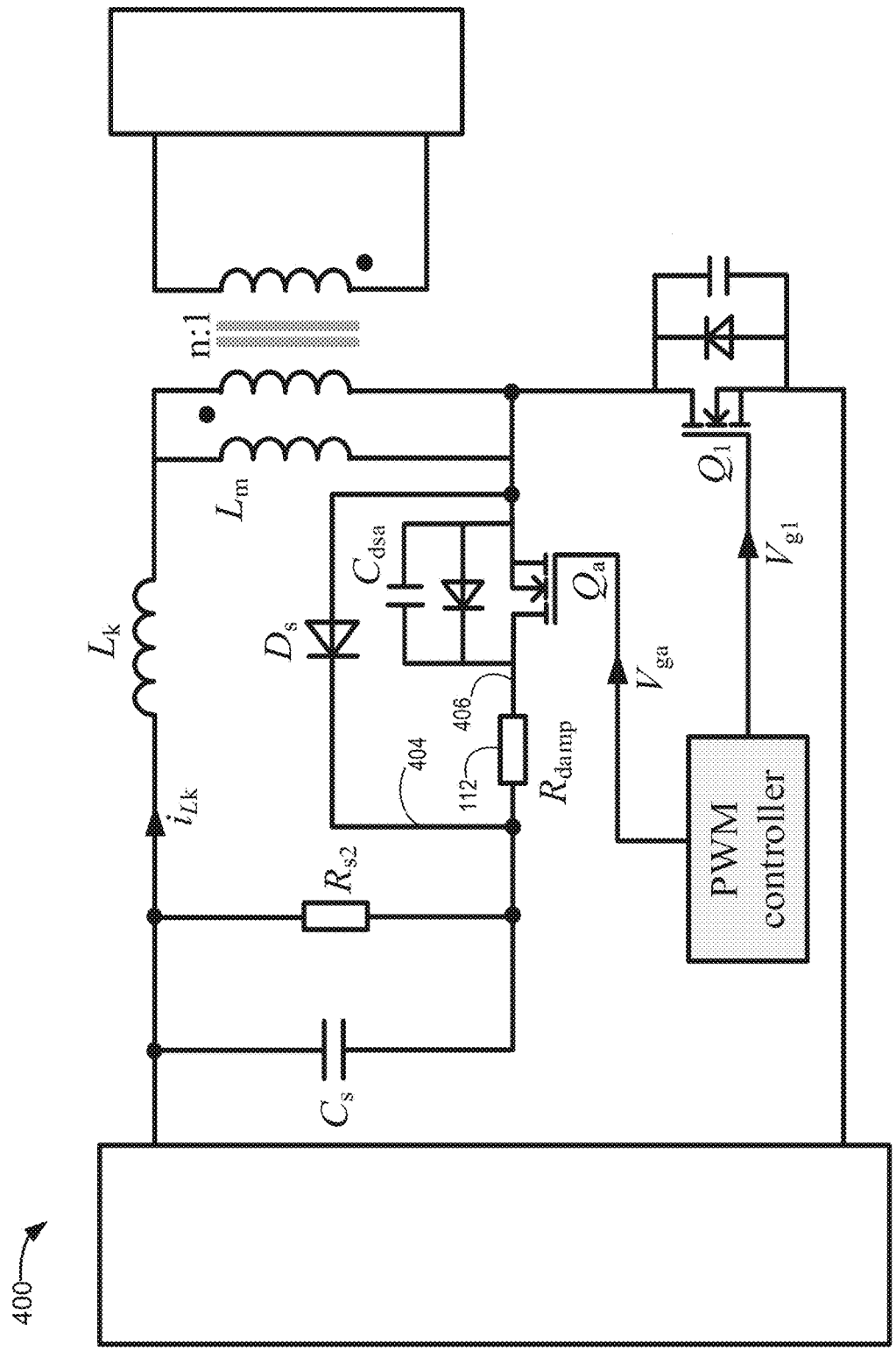
FIG. 4 illustrates a flyback DC-DC converter circuit, which is similar to circuit of FIG. 1 where the damping resistor has been placed in a different arrangement according to an embodiment of the disclosure.

FIG. 4 illustrates a flyback DC-DC converter circuit 400, which is similar to circuit 100, where the damping resistor 112 has been placed between a cathode of the diode 302 and the clamping switch 120 according to an embodiment of the disclosure. In circuit 400, the damping resistor 112 can be connected between nodes 404 and 406. In this embodiment, during the absorption of the leakage inductance energy by the storage capacitor 108, the current $i_{Lk}$ does not flow through the damping resistor 112 because it flows through the diode 302. This can reducing power losses and improve converter efficiency. Therefore, circuit 400 can provide for an improved efficiency for the converter.

Figure 5:
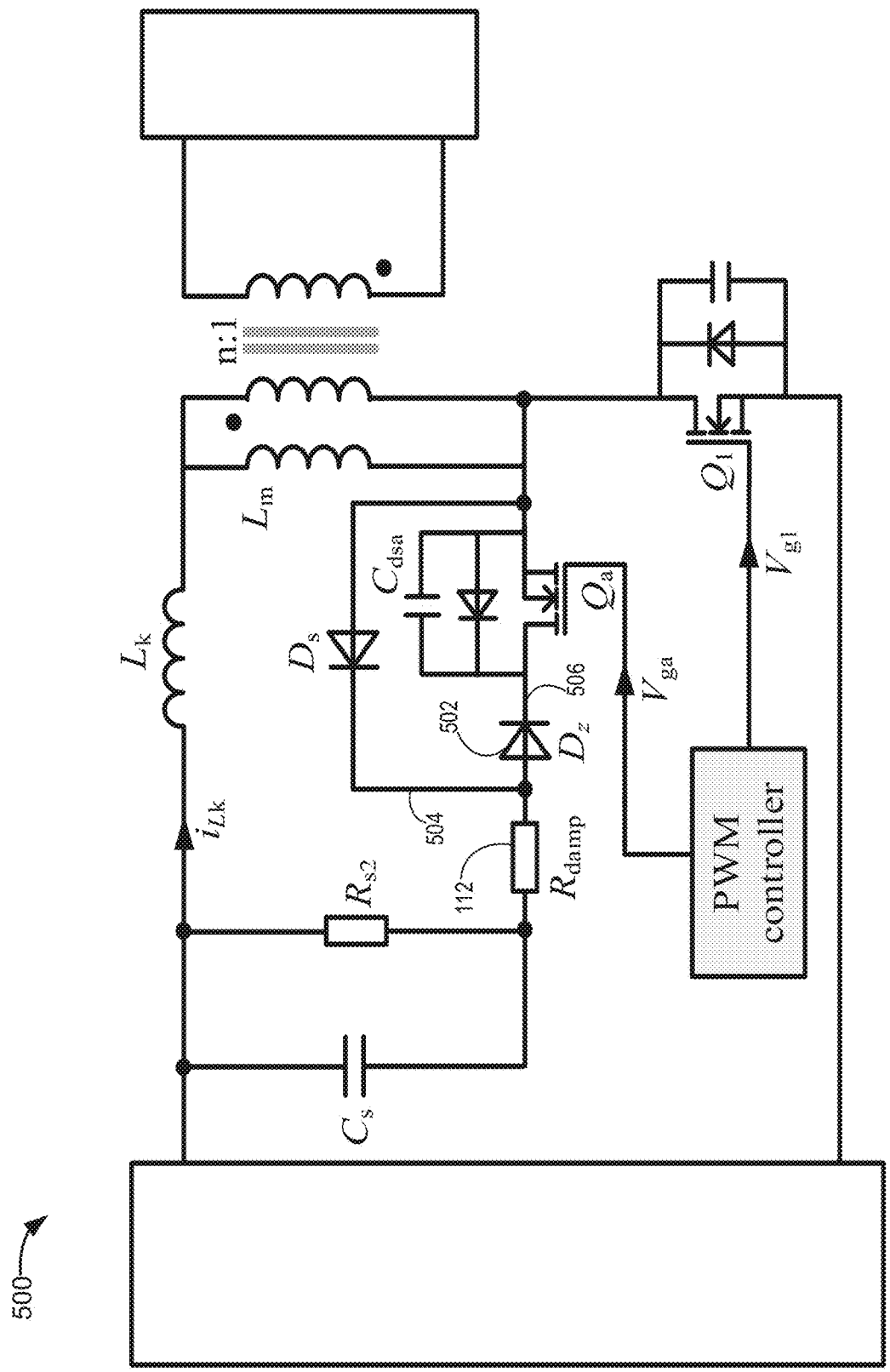
FIG. 5 illustrates a flyback DC-DC converter circuit, which is similar to circuit of FIG. 3, where a blocking diode is added according to an embodiment of the disclosure.

FIG. 5 illustrates a flyback DC-DC converter circuit 500, which is similar to circuit 300, where a blocking diode 502 is added according to an embodiment of the disclosure. In circuit 500, the blocking diode 502 is added between nodes 504 and 506. The blocking diode 502 is connected in a direction that is opposite to the direction of diode 302. The addition of blocking diode 502 can eliminate reverse recovery current of the clamping switch 120, where timing of absorption and release of the leakage inductance energy through the clamping switch 120 is improved. This embodiment can be utilized when a silicon MOSFET is used for the clamping switch 120, because silicon MOSFETS may have relatively long reverse recovery characteristics.

Figure 6:
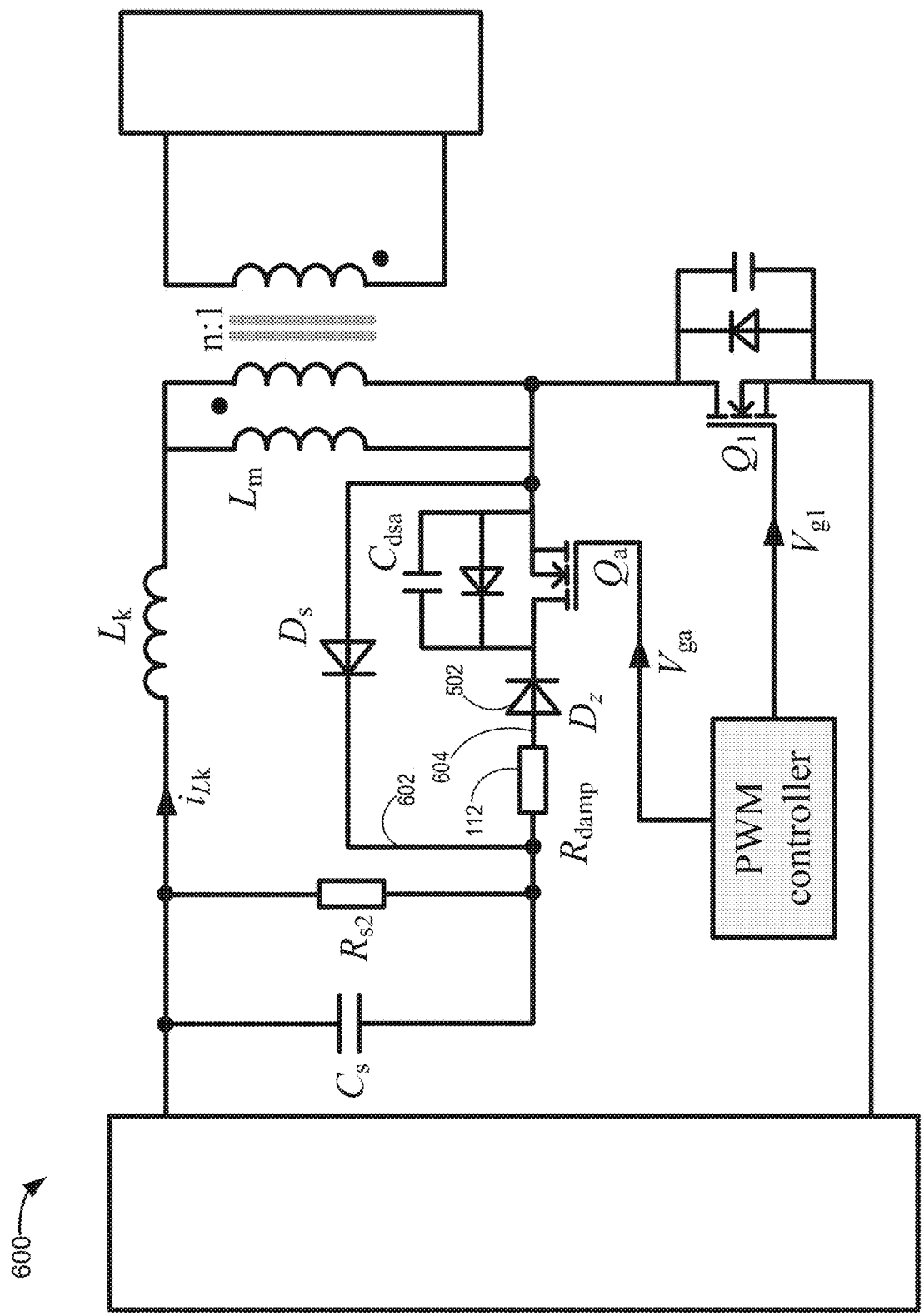
FIG. 6 illustrates a flyback DC-DC converter circuit 600, which is similar to circuit of FIG. 5, where the damping resistor has been placed in a different arrangement according to an embodiment of the disclosure.

FIG. 6 illustrates a flyback DC-DC converter circuit 600, which is similar to circuit 500, where the damping resistor 112 has been connected between nodes 602 and 604 according to an embodiment of the disclosure. By connecting the damping resistor 112 between nodes 602 and 604, during the absorption of the leakage inductance energy by the storage capacitor 108 the current $i_{Lk}$ does not flow through the damping resistor 112 because it flows through the diode 302. This can reducing power losses and improve converter efficiency. Therefore, circuit 600 can provide for an improved efficiency for the converter.

In some embodiments, combination of the circuits and methods disclosed herein can be utilized to achieve an absorption and release of the leakage inductance energy of a transformer, and to reduce the effects of leakage inductance energy such as oscillations, ringing and voltage spikes on internal nodes of a power converter. Although circuits and methods are described and illustrated herein with respect to one particular configuration of a flyback DC-DC converter, embodiments of the disclosure are suitable for reducing the effects of leakage inductance energy of a transformer in other power converter configurations, such as, but not limited to, active clamp forward converters, and push-pull converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising: a flyback DC-DC converter comprising: a transformer having a primary winding and a secondary winding, the primary winding extending from a first terminal to a second terminal; a first switch having a first gate terminal, a first source terminal and a first drain terminal, the first drain terminal coupled to the first terminal of the primary winding; a second switch having a second gate terminal, a second source terminal and a second drain terminal, the second source terminal coupled to the first terminal of the primary winding; and a capacitor coupled between the second drain terminal and the second terminal of the primary winding; wherein the second switch is arranged to transition between on and off states such that a sum of a first time period and a second time period equals a sum of a third time period and a fourth time period, wherein: the first time period is a delay time period from a time that the first switch is turned off to a time that the second switch is turned on; the second time period is a time period that the second switch is on; the third time period is a resonance time period of a resonator, the resonator formed by a leakage inductance of the transformer and a capacitance of the capacitor; and the fourth time period is a time period to discharge the leakage inductance of the transformer into the capacitor.

2. The circuit of claim 1, further comprising a resistor coupled between the capacitor and the second drain terminal.

3. The circuit of claim 2, wherein a resistance of the resistor is equal to or greater than twice a square root of a ratio of the leakage inductance to a capacitance of the capacitor.

4. The circuit of claim 1, further comprising a diode having an anode and a cathode, the anode coupled to the second source terminal and the cathode coupled to the second drain terminal.

5. The circuit of claim 1, wherein the first switch is a metal-oxide-semiconductor field effect transistor (MOSFET).

6. The circuit of claim 1, wherein the first switch is gallium nitride (GaN) based transistor.

7. The circuit of claim 6, wherein the second switch is a GaN based transistor and wherein the first switch and the second switch are integrated on a single GaN based die.

8. A method of controlling a circuit, the method comprising: providing a flyback DC-DC converter comprising: a transformer having a primary winding and a secondary winding, the primary winding extending from a first terminal to a second terminal; a first switch having a first gate terminal, a first source terminal and a first drain terminal, the first drain terminal coupled to the first terminal of the primary winding; a second switch having a second gate terminal, a second source terminal and a second drain terminal, the second source terminal coupled to the first terminal of the primary winding; and a capacitor coupled between the second drain terminal and the second terminal of the primary winding; and controlling an operation of the second switch such that a sum of a first time period and a second time period equals a sum of a third time period and a fourth time period, wherein: the first time period is a delay time period from a time that the first switch is turned off to a time that the second switch is turned on; the second time period is a time period that the second switch is on; the third time period is a resonance time period of a resonator, the resonator formed by a leakage inductance of the transformer and a capacitance of the capacitor; and the fourth time period is a time period to discharge the leakage inductance of the transformer into the capacitor.

9. The method of claim 8, further comprising providing a resistor coupled between the capacitor and the second drain terminal.

10. The method of claim 9, wherein a resistance of the resistor is equal to or greater than twice a square root of a ratio of the leakage inductance to a capacitance of the capacitor.

11. The method of claim 9, further comprising providing a diode having an anode and a cathode, the anode coupled to the second source terminal and the cathode coupled to the second drain terminal.

12. The method of claim 8, wherein the first switch is a metal-oxide-semiconductor field effect transistor (MOSFET).

13. The method of claim 8, wherein the first switch is gallium nitride (GaN) based transistor.

14. The method of claim 8, wherein the second switch is a GaN based transistor and wherein the first switch and the second switch are integrated on a single GaN based die.

15. A method of controlling a circuit, the method comprising: providing a flyback DC-DC converter comprising: a transformer having a primary winding and a secondary winding, the primary winding extending from a first terminal to a second terminal; a first switch having a first gate terminal, a first source terminal and a first drain terminal, the first drain terminal coupled to the first terminal of the primary winding; a second switch having a second gate terminal, a second source terminal and a second drain terminal, the second source terminal coupled to the first terminal of the primary winding; and a capacitor coupled between the second drain terminal and the second terminal of the primary winding; and controlling an operation of the second switch such that a sum of a first time period and a second time period is equal or greater than a sum of a third time period and a fourth time period, wherein: the first time period is a delay time period from a time that the first switch is turned off to a time that the second switch is turned on; the second time period is a time period that the second switch is on; the third time period is a resonance time period of a resonator, the resonator formed by a leakage inductance of the transformer and a capacitance of the capacitor; and the fourth time period is a time period to discharge the leakage inductance of the transformer into the capacitor.

16. The method of claim 15, further comprising providing a resistor coupled between the capacitor and the second drain terminal.

17. The method of claim 16, wherein a resistance of the resistor is equal to or greater than twice a square root of a ratio of the leakage inductance to a capacitance of the capacitor.

18. The method of claim 16, further comprising providing a diode having an anode and a cathode, the anode coupled to the second source terminal and the cathode coupled to the second drain terminal.

19. The method of claim 15, wherein the first switch is a metal-oxide-semiconductor field effect transistor (MOSFET).

20. The method of claim 15, wherein the second switch is a GaN based transistor and wherein the first switch and the second switch are integrated on a single GaN based die.

* * * * *